United States Patent [19]

Bhattacharyya, deceased et al.

[11] Patent Number: 5,215,668

[45] Date of Patent: * Jun. 1, 1993

[54] ANIONIC AND NONIONIC SOLUTION POLYMERS FOR PAINT DETACKIFICATION

[75] Inventors: Bhupati R. Bhattacharyya, deceased, late of Downers Grove, by Uma Bhattacharyya, executrix; Shu-Jen W. Huang, Naperville; Chandrashekar S. Shetty, Lisle; Nang T. Bui, Aurora; Yvonne O. Dunn, Naperville, all of Ill.

[73] Assignee: Nalco Chemical Company, Naperville, Ill.

[*] Notice: The portion of the term of this patent subsequent to May 26, 2009 has been disclaimed.

[21] Appl. No.: 739,113

[22] Filed: Jul. 31, 1991

[51] Int. Cl.$^5$ ............................................. C02F 1/56
[52] U.S. Cl. ........................................ 210/712; 55/85; 134/38; 210/728; 210/734; 210/930; 252/181
[58] Field of Search ............. 55/85; 134/38; 210/712, 210/725, 727, 728, 733-736, 930; 427/331

[56] References Cited

U.S. PATENT DOCUMENTS

| | | | |
|---|---|---|---|
| 3,515,575 | 6/1970 | Arnold | 210/930 |
| 3,990,869 | 11/1976 | Forney | 55/85 |
| 4,055,495 | 10/1977 | Gabel et al. | 252/327 |
| 4,067,806 | 1/1978 | Mauceri | 55/85 |
| 4,564,464 | 12/1984 | Harpel et al. | 252/181 |
| 4,600,513 | 9/1984 | Mizutani et al. | 210/712 |
| 4,637,824 | 1/1987 | Pominville | 55/85 |
| 4,686,047 | 8/1987 | Arots | 210/712 |
| 4,753,738 | 6/1988 | Huang | 210/727 |
| 4,759,855 | 7/1988 | Kaiser | 210/712 |
| 4,863,615 | 8/1988 | Stenger et al. | 210/712 |
| 4,948,513 | 8/1990 | Mitchell | 210/705 |
| 5,076,939 | 12/1991 | Hunter et al. | 210/930 |
| 5,116,514 | 5/1992 | Bhattacharyya et al. | 210/712 |

OTHER PUBLICATIONS

"Paint Spray Booth Sludge Handling" Shu-Jen W. Huang, presentation at SME "Automation of Paint Lines", Apr., 1987, at Chicago, Ill.
"Troublesome Paint Sludge Becomes Plant Fuel Under New Process", Vince Courtenay, Ward's AutoWorld, 1984.
Nalco Literature Search Report, "Paint Detackification and Overspray Wastewater Treatment, 1984-May 1990", Steve Boyle, Search No. 892.
STN International Print Fields, Jun. 6, 1984, P158245Y, pp. 1-11.

*Primary Examiner*—Peter Hruskoci
*Attorney, Agent, or Firm*—Robert A. Miller; James J. Drake

[57] ABSTRACT

Oversprayed paint in a paint spray operation is detackified by dosing the water of the waste water system of such operation with a composition comprising an amphoteric polymer and aluminum salts. The amphoteric polymer contains at least about 10 mole percent of cationic mer units of monoethylenically unsaturated monomer and at least 1 mole percent of anionic mer units. The aluminum salt preferred is aluminum sulfate, or its hydrates, for example alum. The amphoteric polymers preferably contain DMAEM, DMAEM·H$_2$SO$_4$, DMAEM·MCQ, or mixtures thereof, with acrylic acid, methacrylic acid, AMPS, or mixtures thereof. The amphoteric polymers may also contain neutral monomers such as (meth)acrylamide.

9 Claims, 1 Drawing Sheet

ANIONIC AND NONIONIC SOLUTION POLYMERS FOR PAINT DETACKIFICATION

TECHNICAL FIELD OF THE INVENTION

The present invention is in the technical field generally of treatment, and more particularly in the technical field of detackification of waste paint, particularly detackification of oversprayed paint in paint spray booths.

BACKGROUND OF THE INVENTION

In many painting systems for automobiles, various household electrical appliances, and the like, the products are coated or painted in enclosed areas referred to generally as paint spray booths. Generally a significant portion of the paint is oversprayed, that is, not transferred to the object being coated. Such waste paint is generally referred to as oversprayed paint.

The term "paint" as used herein includes paint in its ordinary sense, that is, a mixture of pigment and a suitable liquid vehicle that is reasonably fluid and provides a thin and adherent coating when spread on an appropriate surface. The term "paint" as used herein also includes other paint-like fluid coating materials. Hence the term "paint" as used herein refers to paints, lacquers, varnishes, base coats, clear coats and the like.

Paint spray booths are generally comprised of a chamber, a duct system for passing an air stream down through the chamber, and a sump or recirculating water system, the bulk of which is located at the bottom of the chamber. The air stream is a type of wash stream that generally captures oversprayed paint and carries it towards the sump. The water within the sump is generally treated so that the oversprayed paint, when it is carried to such water, is formed into a paint sludge. Such paint sludge typically floats at or near the surface of such water, can be removed by skimming or similar means.

The tendency of such paint sludge to float also permits reasonably efficient water recycling, because reasonably sludge-free water can be drawn from or near the bottom of the sump. In some installations, water at least partially withdrawn from the sump is pumped upward to a point where it cascades down the sides of the chamber, forming a vertical curtain of water that protects the chamber walls.

It is extremely important to the efficient operation of such paint spray booths, and to the efficient waste treatment of such oversprayed paint wastes, that the oversprayed paint be detackified when it contacts the water system, or waste water system. Such contact may be made with the water present in the booth or with the water recirculated to the water curtain that protects the chamber walls. By detackification is meant herein that the adhesive properties (tackiness) of the paint overspray are minimized or eliminated. It is severely undesirable to have such overspray adhere to the walls of the paint spray booth chamber or the walls of the sump. It is severely undesirable to have such paint overspray adhere to any surface that may be encountered in the spray booth, or during its removal from the spray booth and subsequent disposal.

It is also advantageous if a paint detackifying agent promotes the formation of paint sludge that can be efficiently removed and dewatered. Removal and dewatering of paint sludge is affected by a plurality of sludge characteristics, including besides detackification, cohesiveness to promote easy sludge removal, low water content for total volume reduction, low or no solvent encapsulation to reduce the hazardous properties of the sludge and the like. High solids and minimum solvent are requirements under most sludge landfill disposal regulations. An initial dewatering of the sludge occurs during sludge removal, and the sludge collected may be further dewatered using such devices as a plate and frame filter, a vacuum filter, a centrifuge, a twin belt press or the like. For effective dewatering during the sludge removal, and when the collected sludge is further dewatered using a dewatering device, the sludge paint must be well detackified.

It is also desirable that a paint detackifying agent have a high loading capability in the system in which it is used. A detackifying agent of high loading capability is one that can withstand a high volume of oversprayed paint before exhaustion, that is, the point at which detackification performance falls to an unacceptable level. In a process where the paint detackifying agent is fed to the water system continuously, for instance on a constant feed mode, the loading capacity of the detackifier will determine the maintenance feed rate. A detackifier with a high loading capacity will require a lower maintenance feed rate. If a system is not continuous and is instead run to, or close to, the point of exhaustion of the detackifier present, a detackifier of high loading capability would permit the water system to handle a higher volume of oversprayed paint before shutdown. A paint detackifying agent of high loading capability (amount of oversprayed paint detackified per unit additive) is cost efficient, and in a continuous operation the loading capability of the paint detackification agent is seen from the lower maintenance levels required.

It is also highly desirable that the detackifying agent be dispersible in the waste water system with reasonable efficiency. An additive that requires auxiliary equipment for mixing and dispersing would increase the operation costs and serving time required. Hence, it is desirable that the detackifying agent can be provided in suitable form for charging directly to the waste water system, and be dispersed homogeneously therein rapidly, at normal operating temperatures and without agitation other than that provided by the normal operation pumping action and the like.

As noted above, the paint sludge that is formed generally floats on or near the top of the water present in the sump. Generating such floating sludge, and reducing the amount of sinking sludge, is desirable and extends the time between pit cleanings. Generation of floating sludge in some systems is assisted by air flotation means. The removal of the sludge on or near the top of the water may be accomplished using one or more of a variety of systems, including without limitation by skimming, by screening or straining, by dispersing the sludge in the water of the system and then discharging a portion of such water, and the like. Sinking sludge is generally removed at given periods. In some operations, the sludge removal is continuous and such continuous sludge removal systems frequently use a pedal wheel, skimmer, or a side-stream sludge removal when an air assisted floating unit is used to separate the sludge from the water. As noted above, efficient sludge removal is dependent in part on sludge characteristics. The paint should be well detackified and the sludge preferably should be cohesive.

DISCLOSURE OF THE INVENTION

Figure 1:
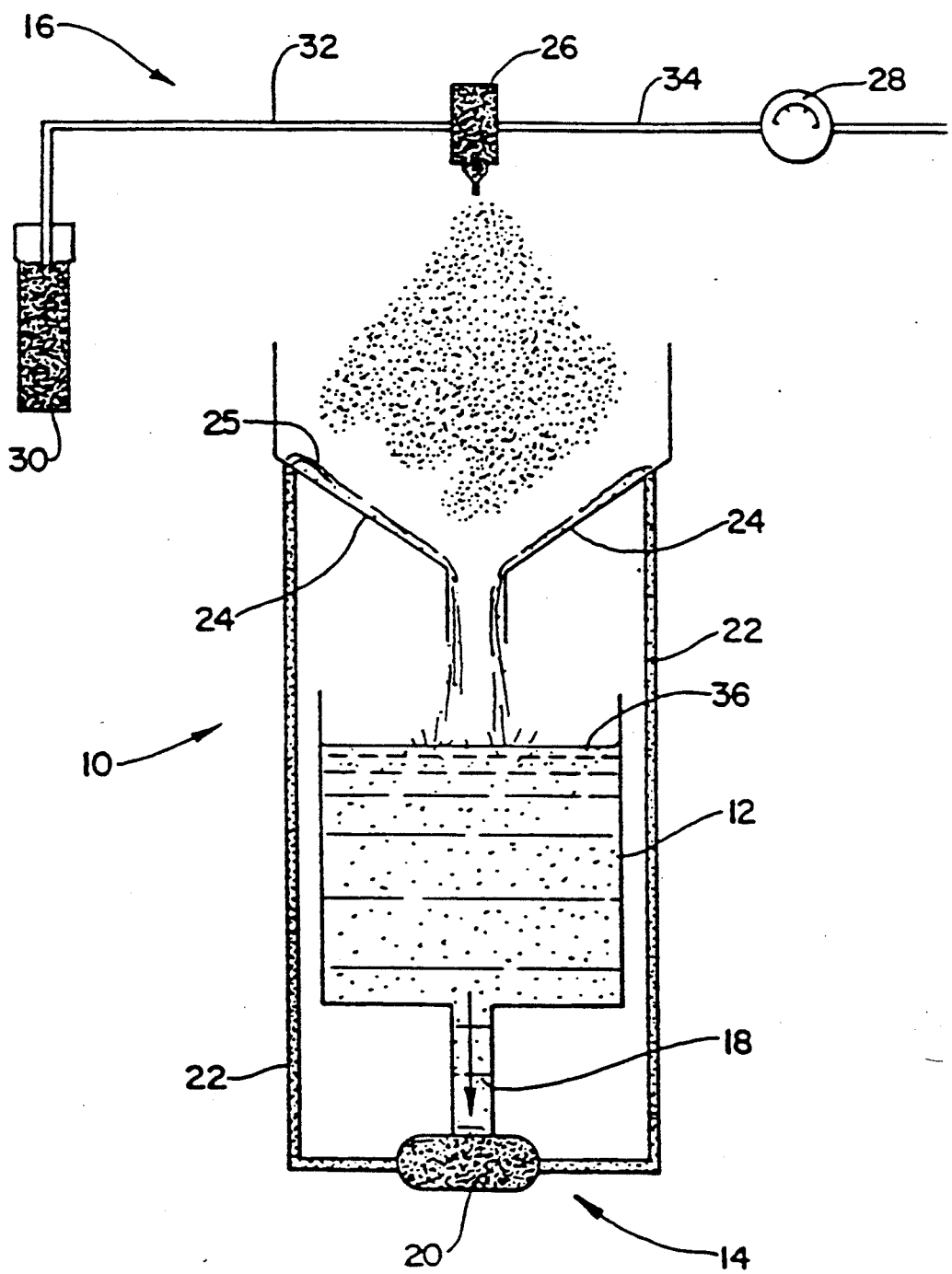
FIG. 1 is a side view of a recirculating test unit used in a Recirculator Test described hereinafter to demonstrate the detackification performance of the present invention on a laboratory scale that simulates commercial paint spray booth operations. The drawing of FIG. 1 is a schematic drawing.

The present invention provides a process or method for the detackification of oversprayed paint in a paint spray operation wherein the oversprayed paint comes into contact with the water of a waste water system. The present invention also provides a method for the treatment of water in a paint spray operation waste water system wherein the oversprayed paint comes into contact with such water. In the present process a composition comprising a polymer and an aluminum salt is added to such water. The polymer is characterized as being amphoteric in nature, that is, in being comprised of at least about 10 mole percent of cationic mer units of monoethylenically unsaturated monomer and at least about 1.0 mole percent of anionic mer units of monoethylenically unsaturated monomer. A mer unit, as this term is used herein, refers to a segment of such polymer that contains two adjacent backbone carbons, and is generally, but not necessarily, derived from the characterizing monomer. Defining a mer unit in terms of a monoethyleneically unsaturated characterizing monomer, although such unsaturation is lost during polymer formation, is well understood in the art. A cationic mer unit, as such term is used herein, includes mer units which would be capable of carrying a cationic charge, even those mer units that do not retain their cationic nature at all pH's. An anionic mer unit would include mer units capable of carrying anionic charge, even those which may not retain the anionic charge at all pH's.

In preferred embodiment, the polymer is one that is also comprised of neutral, or non-charged mer units, such as the acrylamide mer units, as described in more detail below together with the descriptions of other preferred embodiments. The term acrylamide means to include the monomers of either acrylamide or methacrylamide, or mixtures thereof. Preferably the neutral mer unit is acrylamide.

PREFERRED EMBODIMENTS OF THE INVENTION

As indicated above, in preferred embodiment the polymer of the polymer/aluminum salt composition, preferably but not necessarily, consists of co- and terpolymers containing the cationic mer units of monoethylenically unsaturated monomer, the anionic mer units of monoethylenically unsaturated monomer, and, when terpolymeric, the acrylamide mer units. In more preferred embodiment, such polymer is comprised of from about 10 to about 50 mole percent of such cationic mer units, from about 1.0 to about 10 mole percent of such anionic mer units, and from about 40 to about 89 mole percent of such acrylamide units. Again, although such more preferred embodiment includes polymers having a higher mole percent of acrylamide mer units than such anionic and cationic mer units, polymers containing up to 80-99 percent of such cationic mer units are not by implication being excluded. These polymers, however, must contain an anionic mer unit at least to the extent of 1.0 mole percent. Such copolymers of only cationic and anionic mer units of monoethyleneically unsaturated monomer include embodiments of the present invention demonstrating high activity in the process of the present invention.

In more detail, the cationic mer units of ethylenically unsaturated monomer include quaternary ammonium salt mer units and inorganic acid salt mer units of amine containing mer units. The cationic mer units of the polymers employed in various of the Examples below, which mer units, and the abbreviations for such mer units used at times herein, are set forth below in Table 1. It is noted here that a mer unit such as dimethylaminoethylmethacrylate sulfuric acid salt is cationic in nature at pH's of below about 6, and as noted above such a mer unit is clearly not excluded from the category of cationic mer units regardless of the pH of the environment employed in the present process.

TABLE I

| Abbreviation | Cationic Mer Units |
| --- | --- |
| DMAEM.H$_2$SO$_4$ | Dimethylaminoethylmethacrylate sulfuric acid salt |
| DMAEM.MCQ | Dimethylaminoethylmethacrylate methyl chloride quaternary ammonium salt |
| DMAEM.MSQ | Dimethylaminoethylmethacrylate methyl sulfate quaternary ammonium salt |
| DMAEA.MCQ | Dimethylaminoethylacrylate methyl chloride quaternary ammonium salt |
| APTAC | Acrylamidopropyltrimethyl ammonium chloride |

Likewise, the anionic mer units of ethylenically unsaturated monomer include mer units containing carboxylate, sulfonate, phosphonate groups, or mixtures thereof, pendant to the unsaturation. Monomers set forth in Table 2 below are representative, but not limiting.

TABLE 2

| Abbreviation | Anionic Mer Unit |
| --- | --- |
| AA | acrylic acid |
| MAA | methacrylic acid |
| MA | maleic anhydride |
| VS | vinyl sulfonate |
| AMPS | 2-acrylamido-2-methylpropane sulfonic acid |
| Prism | any mer unit having the structure: |

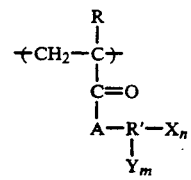

wherein R is H, CH$_3$, or mixtures
thereof; A is —O—, —NH—, or "
R' is a linear alkylene bridge
having from 1–6 carbon atoms
X is chosen from at least one
of —CO$_2$M, —SO$_3$M, —PO$_3$M$_2$ ranges
from 0–4, provided that both n
and m cannot be 0 simultaneously
Y is chosen from at least on of
H, —OH, —NR$_2$, NR$^+_3$ Z—, where Z is a
neutralizing gegenion and n and
both range from 0 to 4, provided that
both cannot be zero.

As mentioned above, in certain preferred embodiments the polymer of the polymer/aluminum salt composition contains from about 40 to about 89 mole percent of acrylamide mer units. In certain more preferred embodiments, such polymer is comprised of from about 60 to about 90 mole percent acrylamide units and from about 15 to about 35 mole percent of such cationic mer units. The anionic units are preferably from 1.0 to about 10.0 mole percent. In certain more preferred embodiments, such polymer is comprised of from about 60 to about 90 mole percent acrylamide units and from about 15 to about 35 mole percent of such cationic mer units. The anionic units are preferably from 1.0 to about 10.0 mole percent. In certain more preferred embodiments, such polymer is comprised of from about 50 to about 80 mole percent of acrylamide units and from about 20 to about 40 mole percent of such cationic mer units, and from about 1 to about 10.0 mole percent anionic mer units.

In other preferred embodiments, the cationic mer units of monoethylenically unsaturated monomer of the polymer of the composition is substantially the DMAEM·H$_2$SO$_4$ mer unit, the DMAEM·MCQ, or the DMAEM mer units. The employment of a copolymer of such mer units with only the anionic mer units in the polymer/aluminum sulfate composition has also provided detackification activity in the present process. In more preferred embodiment, the polymer of the polymer/aluminum sulfate composition used in the present process is substantially a terpolymer of cationic mer units chosen from the group consisting of DMAEM·H$_2$SO$_4$, DMAEM·MCQ, or DMAEM with acrylamide ("AcAm") and acrylic acid having from about 15 to about 50 mole percent of cationic mer unit and from about 50 to 80 mole percent of AcAm. As before, the term acrylic acid means acrylic acid, methacrylic, or mixtures of acrylic acid methacrylic acids, or their salts. Again, the terpolymer contains from about 1.0 to about 10.0 mole percent of an anionic mer unit, preferably chosen from the group consisting of acrylic acid, methacrylic acid, and AMPS. In even more preferred embodiment, the polymer of such polymer/aluminum salt composition is comprised of from about 15 to about 50 mole percent of DMAEM·H$_2$SO$_4$ or DMAEM and from about 50 to about 80 mole percent of AcAm, and from 1 to 10 mole percent acrylic acid.

It is possible to incorporate into the polymer of the polymer/aluminum sulfate composition mer units other than such cationic and anionic mer units of monoethylenically unsaturated monomer and acrylamide mer units, provided that such other mer units do not have any serious deleterious effect on the activity of the composition in the process of the present invention. In such preferred embodiments that are characterized at least in part by the mole percentages of such anionic and cationic mer units and acrylamide mer units, the anionic and cationic mer units and acrylamide mer units would, of course, remain within their respective mole percentage ranges despite the presence of other mer units in the polymer.

In preferred embodiment, the polymer of the polymer/aluminum sulfate composition has an intrinsic viscosity ("IV") of from about 0.4, or 0.5, to about 4.0. In more preferred embodiment, such polymer has an IV of from about 1.0, or 1.2, to about 3.8.

THE ALUMINUM SALTS

Aluminum salt is generally an aluminum sulfate, preferably aluminum sulfate octadecahydrate, which has the chemical formula of Al$_2$(SO$_4$)$_3$ 18H$_2$O, and while the octadecahydrate form is often referred to itself as "alum", the term "alum hydrate" is used herein at times for the octadecahydrate form of aluminum sulfate. Since alum hydrate is about 50 weight percent aluminum sulfate (51.3 wt. percent if the alum hydrate contains the total theoretical water), parameters set forth herein that are based on the weight of alum hydrate are easily convertible to parameters based on weight of Al$_2$(SO$_4$)$_3$.

In preferred embodiment, the polymer/aluminum sulfate composition contains from about 0.1 to about 8.0, or 10.0, parts by weight of alum hydrate (aluminum sulfate as the octadecahydrate) for each part by weight of the polymer.

In more preferred embodiment, the polymer/aluminum sulfate composition is comprised of from about 0.5 to about 5.0 parts by weight of alum hydrate per each part by weight of the polymer. In terms of aluminum sulfate, as Al$_2$(SO$_4$)$_3$, in preferred embodiment the polymer/aluminum sulfate composition contains from about 0.2 to about 4.0, or 5.0, parts by weight of aluminum sulfate per each part by weight of polymer, and in more preferred embodiment, from about 0.25 to about 2.5 parts by weight of aluminum sulfate for each part by weight of the polymer.

In more specific embodiments, the preferred terpolymers of DMAEM, DMAEM·MCQ, or DMAEM·H$_2$SO$_4$ with acrylic acid or methacrylic acid, and acrylamide have an intrinsic viscosity of from about 0.4, or 0.5, to about 4.0, and more preferably from about 1.0, or 1.2, to about 3.8. In further more specific embodiments, the preferred terpolymers are within paint detackifying compositions having from about 0.25 to about 2.5 parts by weight of aluminum sulfate for each part by weight of such amphoteric polymer.

The DMAEM·H$_2$SO$_4$ monomer may be formed by premixing DMAEM and H$_2$SO$_4$ in aqueous solution, prior to charging such components to the polymerization vessel. Alternatively, the DMAEM, AcAm, acrylic acid monomers, and some water of dilution may be charged to the polymerization vessel, and then the H$_2$SO$_4$ required to form the DMAEM·H$_2$SO$_4$ may be added, slowly so as not to raise the temperature of the admixture, prior to the initiation of the polymerization. If the DMAEM·MCQ monomer is used, it is normally charged to the reactor as the methyl chloride quaternary salt. Acrylic acid, methacrylic acid, AMPS, or other anionic mer unit are normally charged to the polymerization vessel as the liquid monomer or an aqueous solution of the monomer or a salt thereof. Most commonly, the salts used may be sodium, potassium, or ammonium salts, although amine salts may also be used.

Preferably, the amphoteric ter-polymer/aluminum sulfate composition is formed as an aqueous solution of the ter-polymer and aluminum sulfate, and is introduced into the waste water system as such an aqueous solution so as to be dispersible in such system with reasonable efficiency and without the use of any auxiliary equipment. Aqueous solutions of such composition having Brookfield viscosities up to about 2,000 cps are readily dispersible in such waste water systems at ambient room temperature, requiring no more agitation for complete dispersion other than the normal agitation provided by virtue of the recycling of the water in the system. Moreover, aqueous solutions of such compositions having Brookfield viscosities up to even 3,000 cps have no significant practical disadvantages as to introduction into the water system. It is an advantage of the present advantage that the polymer/aluminum sulfate composition can be charged to the water of a waste water system in a paint spray operation as an aqueous solution.

The process of the present invention is particularly useful for paint spray operations employing solvent based paints such as clear coats and enamels, and water-borne (water continuous) paints.

In preferred embodiments, the amphoteric polymer/aluminum sulfate (as the octadecahydrate) is added to the waste water system of a paint spray operation (described in detail above) in sufficient amount to provide a concentration thereof in such water of from about 1 to about 1,000 ppm, and more preferably from about 5 to about 250 ppm. In preferred embodiments, the capacity of the amphoteric polymer/aluminum sulfate (as the octadechydrate) composition is from about 100 ml. of oversprayed paint for each 0.01 to 10.0 grams of such composition, and more preferably about 100 ml. of oversprayed paint for each 0.05 to 5.0 grams of such composition, based on actives thereof.

RECIRCULATOR TEST

In the Examples, the paint detackification performance of the process of the present invention was determined using a Recirculator Test, as follows. Referring to FIG. 1, there is shown a recirculator testing unit, designated generally by the reference numeral 10. The recirculator testing unit 10 is comprised of a recirculator vessel 12, a means for recirculating fluid 14, and a paint spray assembly 16. The recirculator vessel 12 is open at its top and bottom to the recirculating means 14. The recirculating means 14 is comprised of a vessel duct 18, a recirculator pump 20, an encircling water-way 22, and a funnel 24. The vessel duct 18 interconnects the vessel 12 with the recirculator pump 20, which pump 20 is disposed below the vessel 12. The encircling water-way 22 encircles the vessel 12 about the vessel's entire side-circumference. The water-way 22 is interconnected to the pump 20, and provides a channel for the fluids passing through the duct 18 and pump 20, upward to the funnel 24, where the fluid falls back into the vessel 12, forming a water curtain 25 along the upper surface of the funnel 24. The paint spray assembly 16 is comprised of a spray gun 26, disposed above the funnel 24, a pressure regulator 28, means for providing pressure (compressed air, not shown), a paint supply 30, and a first and second line 32, 34 interconnecting respectively the spray gun 26 to the paint supply 30 and pressure regulator 28. The Recirculator Test is conducted with the recirculator testing unit 10 as follows. 19,000 ml. of tap water is charged to the recirculator vessel 12 and then the pump 20 is started. The pump 20 draws the fluid (water, and later water and additive) through the duct 18 and pumps it upward through the encircling water-way 22, where the fluid flows down the funnel 24, back into the vessel 12.

An initial charge of detackifying agent is then added, while such pumping is continued for the duration of the test. After the first five minutes of pumping the water and detackifying agent from the vessel up to the water-way 22, sodium hydroxide is added as needed to adjust the pH of the vessel contents to about 8.6, or at least to within the range of from a pH of 8 to a pH of 9. When a stable pH reading at the desired pH is obtained (measured with a standard meter) the paint spray is commenced. The gun 26 is an air atomized spray gun that is directed downward into the funnel 24. The pain spray assembly 16 is preadjusted so as to spray paint into the funnel 24 at a rate of from about 1.5 to about 2.0 ml. of paint per minute, using an air pressure of from about 20 to about 30 psi. The spray gun 26 is disposed about 12 inches above the top rim of the funnel 24. The expected result of such paint spraying and fluid recirculating is the formation of a paint sludge 36 which floats on the top of the vessel fluid 38. Such paint sludge 36 is checked at intervals by the tester, using a water-wetted hand to squeeze a sample of the paint sludge between her or his fingers. Such paint sample is thereby evaluated for tackiness and assigned a numerical rating of from 10 to 0, described in more detail below. At the time of the first sampling and testing, the paint sludge must have a rating of at least 6. The paint spraying and sampling continues until the sludge rating falls to 5, at which initial end point the paint spray is interrupted, the floating paint sludge is removed, a maintenance dose of additive is added to the vessel 12, the pH is measured and readjusted if necessary, and then the paint spraying is recommenced until the rating of 5 end point is reached with such maintenance dosage. Such maintenance dosage runs are repeated at least three times.

The test results are expressed as a paint/chemical ratio which is the total amount of paint sprayed (in ml.) during a maintenance dosage run (until the end point of a rating of 5 is reached), divided by the maintenance dosage of the additive used (in ml. of aqueous solution of additive, discussed below). Generally, when a series of additives were tested by this Recirculator Test, a commercial detackification product was also tested as a "standard", and the test results thus can also be expressed as a "Product Replacement Ratio", which is the paint/chemical ratio of the standard divided by the paint/chemical ratio of the additive being compared. A standard paint is sprayed for the Recirculator Test. This standard paint is a clearcoat paint commercially available under the tradename of DCT-3000 from PPG Industries, Inc.

As indicated from the above description of the Recirculator Test, the activity of a maintenance dosage of the detackification agent is being determined, and such activity is being reported numerically in terms of the detackification capacity (volume of paint) per unit additive dosage, and at times also as the relative activity in comparison to the commercial product. The higher the paint/chemical ratio of an additive, the higher is its detackification performance. The lower the Product Replacement Ratio, the higher is its detackification performance.

In addition, the sludge formation is being observed during the test as to whether the type of sludge being formed is desirable for dewatering properties. The overall best performance may at times be deemed an additive that does not have the highest paint/chemical ratio.

The numerical ratings for the paint sludge samples that are used in the Recirculator Test are set forth below in Table 3.

TABLE 3

| Numerical Rating | Summary Description | Paint Sludge Sample Description |
|---|---|---|
| 10 | Perfect | Complete detackification; sludge is soupy. |
| 9 | Excellent | Sludge is non-tacky and non-gritty |
| 8 | Very Good | Sludge is not tacky or gritty, but slightly plastic and may roll. |
| 7 | Good | Sludge is not tacky, but of |

TABLE 3-continued

| Numerical Rating | Summary Description | Paint Sludge Sample Description |
|---|---|---|
| | | plastic consistency, rolls and can easily reroll. |
| 6 | Okay | Sludge is very slightly tacky, rolls with water and rerolls, and can wash off with rubbing. |
| 5 | Borderline | Sludge may stick slightly to hand but falls off with rubbing |
| 4 | Unacceptable | Sludge has a slight tack, sticks to hand with pressure, does not rub off, and may roll. |
| 3 | Moderate failure | Sludge does not roll, sticks to hand and smears |
| 2 | Severe failure | Sludge is tacky and smears |
| 1 | Sticky | Smears |
| 0 | Raw Paint | Not sludge but more like raw paint |

The initial charge of a detackifier in the Recirculator Test must in all instances provide initially a rating of 6, and if such rating is not provided by the first dosage of additive, the dosage is increased. When the commercial product is tested, as a standard, the initial charge is always 9.5 ml. of the product (active agents and water), and the maintenance charges are always 1.0 ml., same basis.

In a number of the following Examples, the polymer identification information includes Reduced Specific Viscosity ("RSV"), and in such instances, the polymer concentration employed for the RSV that is given is generally set forth in parenthesis following the RSV. The solvent employed for these RSV data was 1 molar aqueous sodium nitrate solution.

EXAMPLES

Terpolymers comprised of AcAm acrylic acid and either DMAEM $H_2SO_4$, DMAEM MCQ or DMAEM at varying mole ratios, and admixed with aluminum sulfate octadecahydrate at a weight ratio of polymer to the aluminum sulfate octadecahydrate of about 1:1.1, were tested by the Recirculator Test, and the results thereof, together with further polymer identifications, are set forth below in Table 4.

the application of cooling means, such as an external ice bath, to minimize any temperature rise above room temperature. A sequestrant, such as ethylenediaminetetraacetic acid tetrasodium salt ("EDTA", available commercially under the tradename of VERSENE from the Dow Chemical Co., of Midland, Mich.) may then be added, as an aqueous solution in additional DI water. The vessel contents are then heated to about 60°–70° C., at which temperature the initiator is added. The initiator may be ammonium persulfate ("APS"), or any other free radical initiator, and is generally also added as an aqueous solution in additional DI water. The temperature of the vessel contents is then maintained at about the initiation temperature ±10° C. for a two hour reaction time, after which the contents are subjected to a post-reaction heating period of about one hour's duration at about 70° C. After the post-heating period, the vessel contents are cooled to ambient room temperature. During this entire procedure, the vessel contents are continually stirred and kept under a nitrogen blanket. If it is desired to reduce residual acrylamide content down to an undetectable level, sodium metabisulfite, as an aqueous solution in additional DI water, may be added after the vessel contents are cooled, and preferably the stirring would then be continued for a number of hours after that addition.

While oxygen is excluded, as described above, these polymerizations may be carried out in the presence of oxygen.

Alternatively, the terpolymer of this invention may be formed by hydrolysis of copolymers of acrylamide and the cationic mer units described above. Hydrolysis is normally carried out at pH's ranging from about 8.0 to about 10.0 at temperatures ranging from about 25° C., to about 95° C. Hydrolysis is preferably carried out prior to admixture with alum. Hydrolysis of these particular cationic copolymers form amphoteric polymers containing acrylamide, acrylic acid, and the cationic mer units originally contained in the starting cationic copolymer.

INDUSTRIAL APPLICABILITY OF THE INVENTION

The present invention is applicable to industries employing paint spray operations, including but not limited to the automotive industry, appliance industries, and the like.

TABLE 4

| SAMPLE ID | MOLE % AcAm | MOLE % DMAEM $H_2SO_4$ | MOLE % DMAEM MCQ | MOLE % AcAcid | MOLE % DMAEM | P/C RATIO | PRODUCT REPLACEMENT RATIO |
|---|---|---|---|---|---|---|---|
| Blank 1 | | | | | | 18/1 | 1.0 |
| Blank 2 | 78.0 | 22.0 | | | | 25/1 | 0.72 |
| Blank 3 | 65.0 | 35.0 | | | | 27/1 | 0.67 |
| Blank 4 | 90.0 | 10.0 | | | | 13/1 | 1.40 |
| Blank 5 | 80.0 | | | | 20.0 | 34/1 | 0.53 |
| Blank 6 | 70.0 | | | | 30.0 | 54/1 | 0.33 |
| Blank 7 | 50.0 | | | | 50.0 | 94/1 | 0.19 |
| Ampho 1 | 78.2 | 20.8 | | 1.0 | | 88/1 | 0.20 |
| Ampho 2 | 78.2 | 16.8 | | 5.0 | | 26/1 | 0.69 |
| Ampho 3 | 75.0 | | | 5.0 | 20.0 | 50/1 | 0.36 |
| Ampho 4 | 68.0 | | | 2.0 | 30.0 | 72/1 | 0.25 |
| Ampho 5 | 65.0 | | | 5.0 | 30.0 | 104/1 | 0.17 |
| Ampho 6 | 60.0 | | | 10.0 | 30.0 | 36/1 | 0.50 |

The polymers used in the present invention may be prepared on a laboratory scale generally as follows. An appropriate polymerization vessel, such as a 2-liter resin flask equipped with stirring and temperature control means, is purged with nitrogen to exclude oxygen therefrom. The desired monomers plus deionized water ("DI water") are admixed in the vessel, generally slowly with

SUMMARY

In summary, we have found that amphoteric polymers containing both anionic and cationic mer units, preferably in the presence also of acrylamide mer units, when admixed with aluminum salts, preferably alum (aluminum sulfate) within certain ratios, provides unexpectedly superior paint detackification in paint overspray contaminated waste waters.

Having described our invention, we claim:

1. A method for the detackification of oversprayed paint in a paint spray operation wherein said oversprayed paint comes into contact with water from a waste water system, the method comprising:
    dosing the water from the waste water system within an effective detackifying amount of a composition comprising:
    a polymer consisting essentially of:
        from about 10 to about 50 mole percent cationic mer units, the cationic met units being selected from the group consisting of dimethylaminoethylmethacrylate sulfuric acid salt, dimethylaminoethylmethacrylate methylchloride quaternary salt or mixtures thereof;
        from about 1 to about 10 mole percent ethylenically unsaturated anionic mer units; and
        from about 40 to 89 mole percent acrylamide mer units,
        wherein the polymer has an intrinsic viscosity of from about 1.2 to about 3.8; and
    from about 0.2 to about 10.0 parts by weight of aluminum sulfate as the octadecahydrate for each part by weight of the polymer.

2. The method of claim 1, wherein the acrylamide mer units are selected from the group consisting of acrylamide monomers and methacrylamide monomers.

3. The method of claim 2 wherein said composition contains from about 0.5 to about 5.0 parts by weight of aluminum sulfate as the octadecahydrate for each part by weight of said polymer.

4. The method of claim 2 wherein said cationic mer units are dimethylaminoethylmethacrylate sulfuric acid salt mer units.

5. The method of claim 2 wherein said cationic mer units substantially are dimethylaminoethylmethacrylate methylchloride quaternary mer units.

6. The method of claim 2 wherein said polymer contain cationic mer units comprising dimethylaminoethylmethacrylate sulfuric acid salt mer units and
    wherein said polymer contains anionic mer units as (meth)acrylic acid.

7. The method of claim 2 wherein said water is dosed with said composition in sufficient amount to provide a concentration of said polymer and said aluminum salt in said water of from about 1 to about 1,000 ppm.

8. The method of claim 2 wherein said water is dosed with said composition in sufficient amount to detackify oversprayed paint and provide a cohesive sludge formation.

9. The method of claim 2 wherein said polymer and said aluminum salts are in the form of an aqueous solution when said water is dosed therewith, and further wherein the polymer is a terpolymer of dimethylaminoethylmethacrylate·$H_2SO_4$, (meth)acrylamide, and (meth)acrylic acid, the aluminum salt is aluminum sulfate octadecahydrate, and ratio of aluminum sulfate to polymer ranges from 0.2 to about 5.0.

* * * * *

UNITED STATES PATENT AND TRADEMARK OFFICE
CERTIFICATE OF CORRECTION

PATENT NO. : 5,215,668
DATED : JUNE 1, 1993
INVENTOR(S) : BHUPATI R. BHATTACHARYYA, et al

It is certified that error appears in the above-identified patent and that said Letters Patent is hereby corrected as shown below:

Column 12, Line 13, Claim 5
methylchloride quaternary mer units.
should read
methylchloride quaternary <u>salt</u> mer units.

Signed and Sealed this

Eighth Day of February, 1994

Attest:

BRUCE LEHMAN

Attesting Officer     Commissioner of Patents and Trademarks